Oct. 1, 1968  R. E. TAYLOR, JR  3,403,447

SENSING SKID SHOE FOR CALIPER DETECTORS

Filed March 4, 1965

INVENTOR
RUEL E. TAYLOR JR.
BY,

ATTORNEYS

United States Patent Office 3,403,447
Patented Oct. 1, 1968

3,403,447
SENSING SKID SHOE FOR CALIPER
DETECTORS
Ruel E. Taylor, Jr., South Windham, Maine, assignor, by mesne assignments, to Scott Paper Company, Delaware County, Pa., a corporation of Pennsylvania
Filed Mar. 4, 1965, Ser. No. 437,104
1 Claim. (Cl. 33—148)

This invention relates to apparatus for detecting sudden changes in the caliper of a moving web of paper and more particularly to an improved sensing skid shoe for caliper detectors.

In the manufacture of fine quality paper, the caliper of the paper must be maintained within relatively strict tolerances. It has been found desirable to inspect the paper web for defects, such as bumps and other variations in thickness which exceed the specifications for the paper, immediately before the web is cut into sheets and to provide suitable apparatus for automatically sorting and separating the sheets that have defects from those that are free from defects. Various types of caliper detectors have been employed for inspecting the moving web for predetermined types of defects and for generating an electrical control signal to actuate the sorting mechanism at the proper instant to eliminate the defective sheets from the flow path of the sheets which conform to the preselected tolerances.

One such caliper detector is described in U.S. Patent 3,037,381, Grant et al., issued June 5, 1962, for a Bump Detector. The Grant et al. bump detector employs a pivotally mounted sensing skid having a bent, flexible metal blade or "shoe" which bears lightly against the moving web of paper. The sensing skid is pivotally mounted above and generally slightly upstream of a web backing roll so that the skid trails on the moving web. Any vertical displacement of a flexible portion of the sensing skid caused by an abrupt change in web caliper is translated by a suitable transducer element into an electrical signal having a characteristic which represents the magnitude of the detected thickness fluctuation. This electrical signal is then used to actuate the paper sheet sorting mechanism whenever the electrical signal reaches a predetermined value.

Although the sensing skid shoe disclosed in the aforementioned Grant et al. patent provided an accurate means for detecting fluctuations in web caliper, the use of a metal blade in contact with the moving web created certain long term operational difficulties which impaired the inherent advantages of the caliper detection apparatus. For example, even though the wear life of the metal blade was acceptable per se, it was found that the metal blade had a tendency to pick up metal chips, sand and other similar objects which became embedded in the web contacting surface of the blade. Once the integrally fabricated web contacting portion of the metal detector blade became contaminated with foreign substances, the entire blade had to be replaced in order to prevent subsequent and repetitive damage to the paper web. The replacement of one or more skid detector blades usually entailed shutting down the entire production line with the result that valuable production time was lost each time a skid blade became contaminated.

Many of the problems associated with metal sensing skid blades having an integrally fabricated web contacting portion can be obviated by utilizing a detachably mounted separate web contacting member which can be replaced while the skid is on the production line and without requiring a partial or complete disassembly of the caliper detector sensing skid. Furthermore, particle contamination can be substantially eliminated by employing a different material, such as for example, glass, for the web contacting portion or member in the sensing skid shoe. The inherent physical characteristics of glass, especially its hardness and grain structure, provide a much longer useful wear life than a corresponding metal web contacting member because the hardness of the glass is sufficient to prevent embedding of foreign particles.

It is accordingly a general object of the present invention to provide an improved sensing skid shoe for web caliper detectors.

It is a specific object of the invention to provide an improved sensing skid shoe having a replaceable web contacting member.

It is still another object of the present invention to provide an improved sensing shoe having a replaceable web contacting member of sufficient hardness to prevent particle contamination.

It is a further object of the present invention to provide an improved sensing skid shoe that is easily and inexpensively fabricated from readily available materials and which is compatible with and can be incorporated in existing caliper detector sensing skids.

In the accomplishment of the above mentioned objects, I employ a sensing skid shoe with a flexible portion having formed therein a snap-fitting receptacle for a replaceable web contacting member which preferably comprises a glass rod. It is a feature of my invention that once the snap-fitted glass web contacting rod displays any signs of excessive wear, it can be removed from the snap-fitting receptacle and reinserted so that a new surface area is exposed for contact with the moving web.

These objects and other objects and features of the present invention will be apparent from the following description of a preferred embodiment thereof, selected for purposes of illustration, and shown in the accompanying drawings in which.

Figure 1:
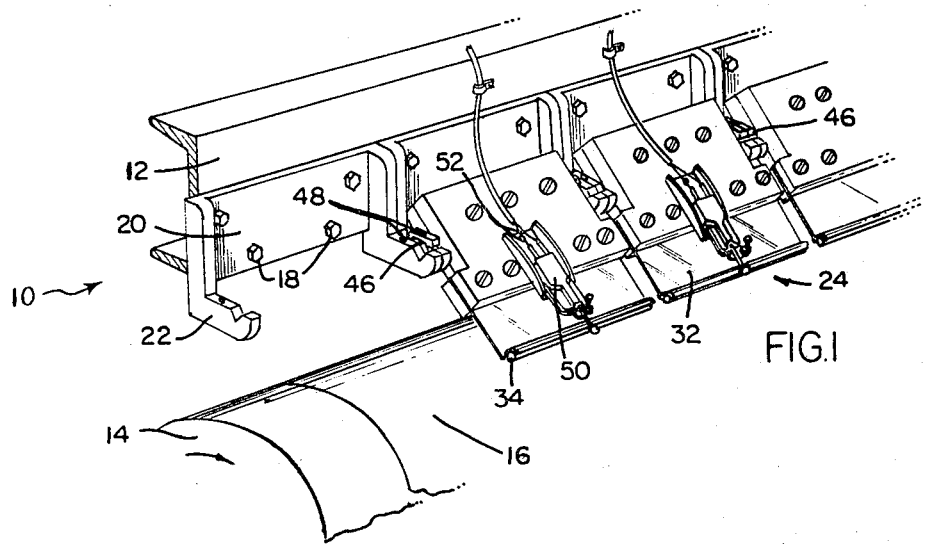
FIG. 1 is a perspective view of a caliper detection apparatus having a sensing skid with an improved sensing skid shoe mounted thereon and shown in operating relation to a moving web.

Turning now to the drawings and particularly to FIG. 1 thereof, there is shown in perspective view a web-caliper detection apparatus indicated generally by the reference numeral 10. The caliper detection apparatus comprises a horizontal beam 12 mounted above and slightly upstream of a roll 14 which supports a moving paper web 16 and which may be either a driven roll or an idler. Attached to the horizontal beam 12 by means of bolts 18 is a series of brackets 20 each having a pair of parallel spaced horizontal arms 22 which project in a downstream direction away from beam 12 and at right angles to the axis of roll 14. The brackets 20 extend in an even line along the downstream side of the horizontal beam 12 and support a plurality of sensing skids, indicated generally as 24. Each sensing skid 24 has a body portion comprising: two relatively thick plates 26 and 28 which are held in superposed relation by screws 30; a thin, flexible and generally rectangular detector blade 32 sandwiched between plates 26 and 28; and, a web contacting member 34 mounted on the distal edge of detector blade 32. Alternatively the body can be made of a single plate merely having a saw cut to accommodate the flexible blade. Collectively, the detector blade 32 and the web contacting member 34 comprise the improved sensing skid shoe of the present invention and will be described hereinafter in greater detail.

Figure 2:
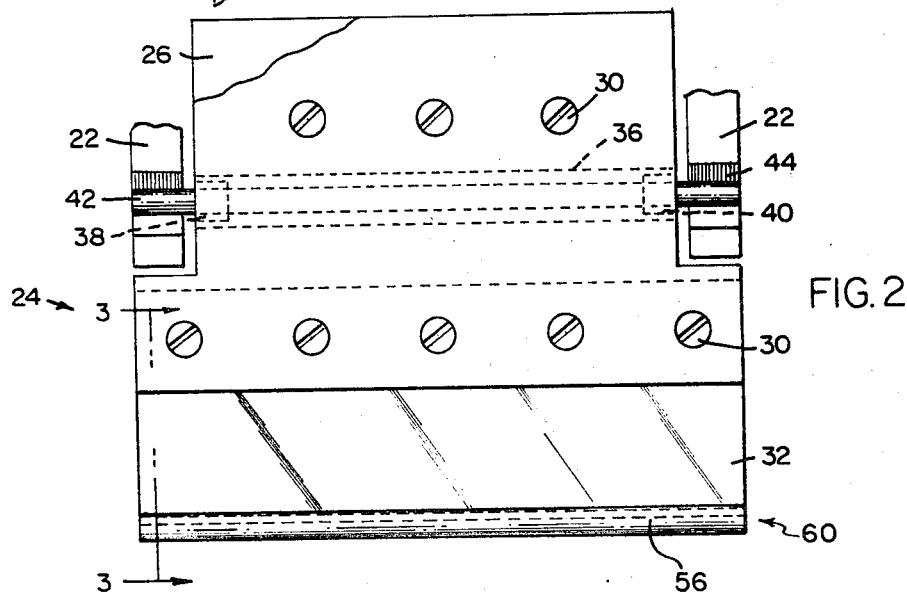
FIG. 2 is an enlarged plan view of one of the sensing skids shown in FIG. 1.

Referring now to the enlarged plan view of the sensing skid 24 shown in FIG. 2, the sensing skid plates 26 and 28 are provided with matching semicylindrical grooves which define a transversely extending channel within which is held a tube 36 whose ends contain bearings 38 and 40. Rotatably journaled in bearings 38 and 40 and extending beyond the ends of tube 36 is a shaft 42 the ends of which are seated in V-shaped notches 44 cut in the arms of brackets 20. The ends of shaft 42 are releasably held down in V-shaped notches 44 by latches 46 which are pivotably secured to the bracket arms by means of screws 48. The sensing skid 24 is thus free to rotate about the shaft axis which is located slightly upstream of the center of gravity of the sensing skid so that the skid will normally tilt downwardly in a downstream direction as shown in FIG. 1. In this position, the web contacting member 34 rides on the moving paper web 16 and is in trailing contact therewith.

Assuming now that the paper web 16 has a bump in its top surface and that it is traveling at an appreciable speed, the bump will produce a sharp blow on one of the sensing skids 24 as it travels over roll 14. Owing to the moment of inertia of the sensing skid 24, the flexible metal detector blade 32 will yield first to absorb the effect of the blow and to allow the bump to pass on downstream, and almost instantaneously thereafter, the sensing skid 24 will pivot upwardly in reaction to the energy absorbed by the plate. In yielding to the bump, the metal detector blade 32 bends upwardly, i.e., flexing relative to the body portion of the sensing skid. Although this flexing action is invisible to the naked eye because of the relatively small deformation of the blade and the speed with which such deformation occurs, the magnitude of the deformation is sufficient to be detected by electromechanical means.

The deflection of the metal detector blade 32 in response to bumps or rapid changes in web caliper is detected by means of a suitable transducer 50 mounted on the sensing skid 24 as depicted in FIG. 1. Any one of the number of well known transducers can be employed to convert the mechanical flexing motion of the detector blade 32 into an electrical signal having a characteristic which varies in accordance with the magnitude of the flexing action. The electrical signal generated by the transducer 50 is coupled through wires 52 to the input of an electrical circuit (not shown) which actuates the sheet sorting mechanism (not shown) whenever the input signal reaches a preselected magnitude.

Figure 3:
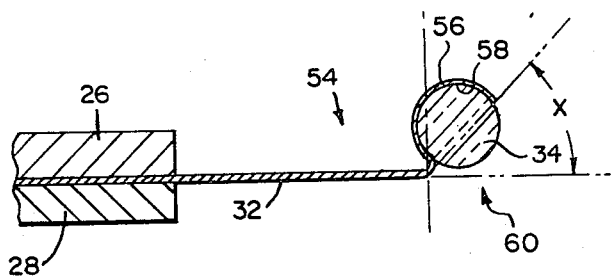
FIG. 3 is a sectional view taken along line 3—3 of FIG. 2 showing a flexible detector blade and a snap-fitted web contacting member.

Having described in general the components and operation of a web caliper detection apparatus, I will now describe in detail the structure of my improved sensing skid shoe which is shown in enlarged view in FIGS. 2 and 3 and identified generally by the reference numeral 54. The detector blade 32 is fabricated from a sheet of relatively thin and flexible material preferably of stainless steel so that the detector blade will not be adversely affected by the operating environment. The size and shape of the detector blade are determined by the type of web caliper detection system in which the blade will be employed. As previously mentioned, it is a feature of my invention that the improved sensing skid shoe 54 is compatible with and can be incorporated in existing caliper detection systems. Thus, the physical parameters of the detector blade, including size, shape and the position of the mounting holes for the corresponding skid plate screws 30, can be varied to meet particular design characteristics of existing or proposed caliper detection sensing skids.

The construction of a preferred embodiment of the detector blade 32 is illustrated in FIGS. 2 and 3 of the drawings. The blade shown therein has a rectangular shape which is compatible with existing sensing skids of the type disclosed in the Grant et al. patent cited above. One edge of the detector blade is die formed into an upward projection or lip 56 which extends transversely across the width of the blade and has a generally right, semicylindrical configuration as shown in plan view in FIG. 2 and in cross-section in FIG. 3. Referring to FIG. 3, it can be seen that lip 56 is curved through an arc slightly in excess of 180° to provide a lower lip surface 58 which defines a corresponding semicylindrical channel or snap-fitting receptacle 60 for the web contacting member 34. The lip itself is bent upwardly by an amount indicated by the angle X in FIG. 3. The number of degrees in angle X is determined by the particular sensing skid installation and is selected to provide the proper angular relationship between the web contacting member 34 and the moving web 16, as shown in FIG. 1.

The spring-like tendency of the relatively flexible, die formed lip 56 is sufficient to hold the glass web contacting rod 34 securely within the semicylindrical channel 60 during normal caliper sensing operations, yet it is weak enough to permit easy removal and replacement of the web contacting rod. The relative ease of rod removal and replacement is one of the important features of my invention. The web contacting rod 34 can be removed and either replaced with a new rod or rotated so that a new surface is exposed to the moving web without having to detach the sensing skid 24 from the caliper detection installation. This is a significant advance over the prior art systems in which the sensing skid 24 had to be removed from the caliper detection installation and then disassembled in order to replace the entire detector blade. In contrast to the prior art sensing skids, the improved sensing skid shoe 54 of my invention permits removal and replacement of the web contacting rod while the sensing skid is mounted in the caliper detection apparatus thus reducing down time and providing a concomitant reduction in production cost.

From the foregoing description it will now be apparent to those skilled in the art that numerous minor variations of the preferred embodiment of my invention herein shown, are possible, and accordingly, it is not my intention to confine the invention to the precise form shown herein, but rather to limit it in terms of the appended claim.

Having thus described and disclosed a preferred embodiment of my invention, what I claim is new and desire to secure by Letters Patent of the United States is:

1. In a caliper detector sensing skid having a rigid body member, a skid shoe and transducer means for converting skid shoe motion into an electrical signal having a characteristic which varies in accordance with the motion of said skid shoe, an improved skid shoe comprising: a flexible detector blade detachably secured to said rigid body member with a portion thereof extending beyond said body member, said portion terminating in a transverse, upwardly extending, generally semicylindrical lip having a curvature in excess of one hundred and eighty degrees and a lower surface which defines a corresponding semicylindrical snap-fitting receptacle; and a cylindrical web contacting member releasably held within said receptacle.

References Cited
UNITED STATES PATENTS

| | | | |
|---|---|---|---|
| 667,665 | 2/1901 | Beckh | 33—14 |
| 1,540,473 | 6/1925 | Hitchcock | 33—167 |
| 2,197,757 | 4/1940 | Brescka et al. | |
| 2,392,010 | 1/1946 | Stevens | 73—159 |
| 2,420,637 | 5/1947 | Dykoski | 33—174 |
| 2,423,094 | 7/1947 | Gardner | 33—178 |
| 3,037,381 | 6/1962 | Grant et al. | 73—159 |

FOREIGN PATENTS

| | | |
|---|---|---|
| 642,621 | 5/1928 | France. |
| 249,156 | 3/1948 | Switzerland. |

WILLIAM D. MARTIN, JR., *Primary Examiner.*